United States Patent [19]

Pockat et al.

[11] Patent Number: 4,997,710

[45] Date of Patent: Mar. 5, 1991

[54] BARRIER COEXTRUDED FILM FOR COOK-IN APPLICATIONS

[75] Inventors: Gregory R. Pockat, Simpsonville; Hubert J. Cook, Greenville; Paul J. Satterwhite, Simpsonville, all of S.C.

[73] Assignee: W. R. Grace & Co.-Conn., Duncan, S.C.

[21] Appl. No.: 251,154

[22] Filed: Sep. 29, 1988

[51] Int. Cl.$^5$ .................................................. B32B 7/12
[52] U.S. Cl. ..................................... 428/349; 428/36.7; 428/476.1; 156/244.11
[58] Field of Search ............... 428/476.1, 349, 36.6, 428/36.7; 156/244.11

[56] References Cited

U.S. PATENT DOCUMENTS

| | | | |
|---|---|---|---|
| 4,355,721 | 10/1982 | Knott et al. | 428/35 |
| 4,755,419 | 7/1988 | Shah | 428/476.1 |
| 4,828,915 | 5/1989 | Schroeder et al. | 428/332 |

*Primary Examiner*—Edith Buffalow
*Attorney, Agent, or Firm*—John J. Toney; William D. Lee, Jr.; Leigh P. Gregory

[57] ABSTRACT

A multilayer layer cook-on film utilizes a linear low density polyethylene sealant and, in place of a relatively thick and expensive adhesive layer, two thin adhesive layers having between them an intermediate layer of ethylene alpha-olefin copolymer.

7 Claims, 1 Drawing Sheet

BARRIER COEXTRUDED FILM FOR COOK-IN APPLICATIONS

BACKGROUND OF THE INVENTION

This invention relates generally to gas impermeable, thermoplastic packaging film which can be heat sealed to itself or to another material to form a flexible or semi-flexible package. The invention relates more particularly to the use of such film in packaging food products in which the packaged product is submerged in heated water or autoclaved or retorted for a substantially period of time for pasteurizing or cooking the packaged product, the packaging material being essentially non-degradable under such conditions.

There is a need in the food packaging industry for a packaging film from which packages can be made which are of improved structural soundness, and provide excellent toughness and package integrity in cook-in applications. The cooking conditions are often severe enough to cause delamination or degradation of the packaging material in some cases. For the sake of package appearance, it is desirable to have a precooked food product which is attractively packaged inside a preferably transparent film within which it is precooked.

The term "pasteurizable" as used herein is intended to refer to packaging material structurally capable of withstanding exposure to pasteurizing conditions while containing a food product. Many food products require pasteurization after they have been hermetically packaged to destroy harmful microbes which grow in the absence of air. Specific pasteurization requirements tend to vary by country; however, limiting conditions probably are submersion of the hermetically sealed product in water at 95° C. for one hour. Thus, for a bag to be characterized as pasteurizable, structural integrity of the bag must be maintained during pasteurization, i.e. the bag must have superior high temperature seal strength and must be delamination resistant under such time-temperature conditions.

Optionally, the packaging material is heat shrinkable under pasteurizing conditions so as to provide an attractively packaged pasteurized food product.

The term "cook-in" as used herein is intended to refer to packaging material structurally capable of withstanding exposure to cook-in time-temperature conditions while containing a food product. Cook-in packaged foods are essentially prepackaged, precooked foods that go directly to the consumer in that configuration which may be consumed with or without warming. Cook-in time-temperature conditions typically refer to a long slow cook, for example submerging in water at 70°–80° C. for four to six hours. Such cook-in time-temperature requirements are representative of institutional cooking requirements. Submerging at 80° C. for twelve hours probably represents the limiting case. Under such conditions, a packaging material properly characterized as cook-in will maintain seal integrity and will be delamination resistant. Optionally, the packaging film is heat shrinkable under these conditions so as to form a tightly fitting package and preferably should have some tendency for product adhesion to prevent cook out or collection of juices between the surface of the food product and the interior surface of the packaging material.

A number of characteristics are required for cook-in packaging film. First, packages made from such film must have seal integrity under such conditions i.e. the heat sealed seams should resist being pulled apart. As a corollary, the film sould be heat sealable either to itself or to another material. In the case of cook-in packages having thermoformed cavities for placement of a product, a non-forming cover web is typically vacuum sealed to the formed web to create the cook-in package.

Secondly, such materials must be delamination resistant, i.e. the multilayers making up the film must not separate or blister.

Additionally, the food contact layer of such film must qualify under the appropriate food laws and regulations for safe food contact.

A fourth consideration is the oxygen barrier or vapor barrier properties of the material, which are preferably high to maintain the freshness of the food contained therein.

Additional desirable characteristics in some package applications are heat shrinkability during the cook-in process to provide a packaging material which fits snugly around the product contained therein, as well as optical clarity where eye appeal of the packaged product is desired.

Various cook-in packaging materials are currently available in the market place U.S. Pat. No. 4,469,742 issued to Oberle et al describes a pasteurizable and/or cook-in shrink film which employs a hydrolyzed ethylene vinyl acetate copolymer (ethylene vinyl alcohol copolymer or EVOH) in a multilayer structure suitable for cook-in applications.

Another current film structure, such as shown in U.S. Pat. No 4,683,170 (Tse et al), has a five layer construction in which a core layer of ethylene vinyl alcohol copolymer is adhered to an inner ionomeric sealant layer, and to an outer nylon abuse layer, by means of respective tie layers, one on either side of the core layer. This latter structure requires the use of relatively thick tie layers. In some cases these tie materials, such as the Plexar series of resins available from Quantam and the CXA series of polymeric adhesive resins available fro du Pont, are typically very specialized and relatively espensive materials.

These tie or adhesive materials, in addition to their expense, typically lack the required toughness often required in the severe cook-in regime often encountered in food processing.

EVOH is well known for its moisture sensitivity. In the current structure just described it is necessary to extrude a relatively thick layer of the expensive adhesive layers in order to provide some moisture protection for the EVOH. That is, in order to prevent ingress of moisture both from the food product side (sealant side) as well as the outside environment (abuse layer side) only two layers are available on either side of the EVOH layer to provide such a moisture barrier.

It is therefore desirable to provide a more economical multilayer packaging material which takes advantage of the benefits of ethylene vinyl alcohol copolymer, but provides a more economical means of reducing moisture ingress into the packaging material during the cook-in process.

It is another object of the invention to accomplish the first object without sacrificing film toughness, and preferably actually increasing film toughness.

The present invention accomplishes both of these objects as described further below.

SUMMARY OF THE INVENTION

In one aspect of the invention, a multilayer cook-in film comprises an inner sealant layer, a core layer of ethylene vinyl alcohol copolymer, an outer polyamide layer, the sealant layer bonded to the core layer by means of an intermediate adhesive layer, and the polyamide layer bonded to the core layer by means of a three-layer construction having two relatively thin adhesive layers, and intermediate between and bonded to the two adhesive layers, a relatively thick layer of an ethylene alpha-olefin copolymer.

In another aspect of the invention, a method of making a cook-in film comprises coextruding an inner sealant layer, a core layer of ethylene vinyl alcohol copolymer, an outer polyamide layer, an adhesive layer intermediate the core layer and sealant layer, a relatively thick layer of ethylene alpha-olefin copolymer between two relatively thin adhesive layers, the latter three layers interposed between and bonding the core layer to the outer polyamide layer; and quenching the coextruded film.

BRIEF DESCRIPTION OF THE DRAWING

The invention may be further understood by reference to the sole figure drawing in which a schematic cross section of a multilayer film in accordance with the invention is shown.

DESCRIPTION OF THE PREFERRED EMBODIMENTS

Figure 1:
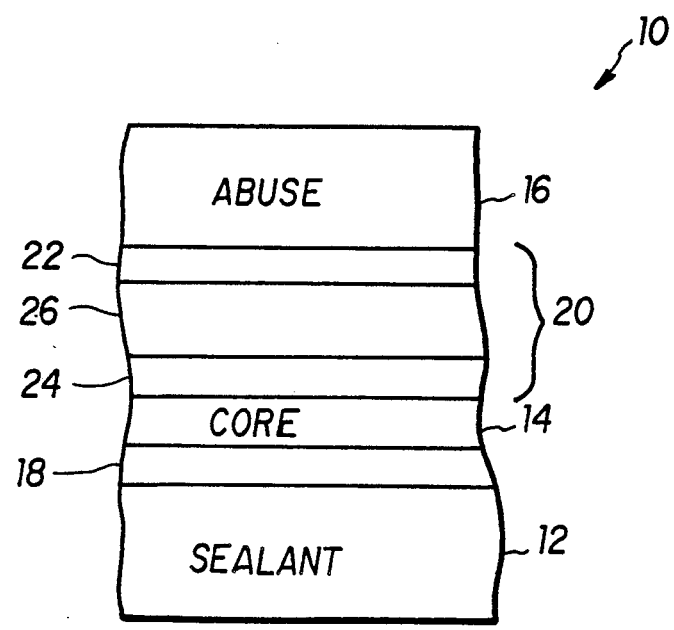

Referring to the sole figure drawing, a multilayer film 10 has an inner heat sealable layer 12. Sealant layer 12 will preferably form an outer surface of the final packaging film prior to the package making process. For example, the multilayer film of the present invention can be used as a non-forming web in combination with a forming web to produce the package. In a typical packaging operation, a forming web is formed into a mold to provide a film cavity in which a food product is placed. Many meat products are packaged in this manner. A non-forming web such as the web of this invention can then be placed over the cavity and vacuum sealed by means well known in the art to the periphery of the forming web. The sealant layer 12 of film 10 will then bond to the sealant material of the forming web. Of course, the film 10 can also be bonded to itself where it is desirable to use the film to make a bag or pouch.

Sealant layer 12 preferably comprises an ethylene alpha-olefin copolymer (EAO), and more preferably linear low density polyethylene (LLDPE). Linear materials with lower densities, such as the materials known as very low density polyethylene (VLDPE) or ultra low density polyethylene (ULDPE) are also suitable for use in the sealant layer.

As depicted in the figure, the sealant layer is preferably a relatively thick layer, more preferably forming about 31% of the total film structure thickness. This provides some moisture protection for the core layer 14 comprising ethylene vinyl alcohol copolymer.

Abuse layer 16 comprises a polyamide, more preferably nylon 6. This layer will preferably comprise the other outer surface of the final packaging material when film 10 is used alone, or part of the outer surface when film 10 is used in combination with a distinct forming web of different construction.

Abuse layer 16 is likewise preferably thick in relation to the other layers of the multilayer film, and more preferably about 25% of the total thickness of the structure in order to provide, as in the case of sealant layer 12, moisture protection for the core layer 14.

A relatively thin adhesive layer 18 bonds sealant layer 12 to core layer 14. This material is preferably a modified LLDPE-based polymeric adhesive. Polymeric adhesives with other polyolefin bases may also be suitable to some extent in bonding sealant layer 12 and core layer 14, but may show lower delamination resistance than the adhesive described above.

A particularly significant feature of the invention is shown as a three layer construction 20 in the figure drawing. This construction 20 includes two relatively thin tie layers 22 and 24. A relatively thick intermediate layer 26 comprising an ethylene alpha-olefin copolymer is interposed between and bonded to layers 22 and 24.

As in the case of sealant layer 12, the relatively thick layer 26 provides both increased toughness for the overall film, as well as better moisture protection for the EVOH core layer 14.

An additional benefit of such a construction is the relative economy of producing such a material compared with the use of thicker tie resins 22 or 24. Thus, adhesive layers 22 and 24, preferably comprising a modified LLDPE polymeric adhesive, provide adhesion to the abuse layer 16 and core layer 14 respectively. At the same time, the relatively thick layer 26 of for example LLDPE provides additional toughness and moisture protection, as well as a more economical film structure from the viewpoint of raw material costs.

As in the case of adhesive layer 18, adhesive layers 22 and 24 are preferably LLDPE based, but can also be made from other adhesive materials with varying degrees of interlaminar bond strength.

The invention may be further understood by reference to the following examples.

EXAMPLE 1

A multilayer film is made in a cast coextrusion process from a multilayer die and quenched. The quenched material is taken up on a take up roll.

The multilayer film has the following construction:

NYLON/TIE/LLDPE/TIE/EVOH/TIE/LLDPE
20    10    10    10    15    10    25

The numbers underneath each of the materials represent the percentage thickness of each layer compared with the full thickness of the film. The overall film is about 4 mils thick.

The tie layer comprises Bynel E325, an anhydride grafted LLDPE available from du Pont.

The nylon is nylon 6, and the EVOH of the core layer was EVAL SC-F101, having a vinyl acetate content of about 32 mol percent.

The LLDPE of the intermediate and sealant layers is made from Dowlex 3010.

EXAMPLE 2

A film like that of Example 1 is made, but in which the tie layer adjacent the nylon layer comprises about 8% instead of 10% of the film structure; the next tie layer comprises about 7% instead of 10% of the film structure, and the sealant layer of LLDPE comprises about 30% instead of 25% of the film structure.

The nylon 6 of both Examples 1 and 2 is Capron, 8207F available from Allied.

EXAMPLE 3

A multilayer cook-in film material like that of Examples 1 and 2 was produced. The differences included a different nylon 6, Ultramid B33-F available from BASF.

The tie layers were made from Bynel E205, a LLDPE based anhydride grafted resin available from du Pont.

This non-forming web had a thickness of between 3 and 5 mils.

Layer percentages were as follows:

25/8/8/8/10/8/33

EXAMPLE 4

A multilayer cook-in material like that of Example 3 was produced, having NF500 polymeric adhesive resin available from Mitsui under the trademark Admer in place of the du Pont resin, for the two tie layers on either side of the EVOH core layer.

Preferred layer gauges for the films of the present invention are as follows:

| Nylon 6, Nylon 66, Nylon 6, 66 | 10 to 30% |
| --- | --- |
| Tie Layer | 5 to 10% |
| EAO | 7 to 20% |
| Tie Layer | 5 to 10% |
| EVOH | 5 to 20% |
| Tie Layer | 5 to 10% |
| EAO | 15 to 40% |

The overall film gauge is preferably between about 2 and 10 mils in thickness.

Although the invention has been described by reference to the description and the Examples given above, those in the art will readily appreciate that modifications may be made after review of the specification without departing from the spirit and scope of the claims that follow.

What is claimed is:

1. A multilayer cook-in film comprising:
   (a) an inner sealant layer;
   (b) a core layer of ethylene vinyl alcohol copolymer;
   (c) an outer polyamide layer;
   (d) the sealant layer bonded to the core layer by means of an intermediate adhesive layer; and
   (e) the polyamide layer bonded to the core layer by means of a three-layer construction having:
      (i) two relatively thin adhesive layers, and
      (ii) intermediate between and bonded to the two adhesive layers, a relatively thick layer of an ethylene alpha-olefin copolymer.

2. A multilayer film according to claim 1 wherein the inner sealant layer comprises an ethylene alpha-olefin copolymer.

3. A multilayer film according to claim 2 wherein the ethylene alpha-olefin copolymer comprises linear low density polyethylene.

4. A multilayer cook-in film according to claim 1 wherein the polyamide is nylon 6.

5. A multilayer cook-in film according to claim 1 wherein the adhesive layers of the film are an anhydride modified linear low density polyethylene adhesive.

6. A multilayer film according to claim 1 wherein the relatively thick ethylene alpha-olefin copolymer is a linear low density polyethylene.

7. A method of making a cook-in film comprising:
   (a) coextruding an inner sealant layer, a core layer of ethylene vinyl alcohol copolymer, an outer polyamide layer, an adhesive layer intermediate the core layer and sealant layer, a relatively thick layer of ethylene alpha olefin copolymer between two relatively thin adhesive layers, the latter three layers interposed between and bonding the core layer to the outer polyamide layer; and
   (b) quenching the coextruded film.

* * * * *